United States Patent [19]
Schmitz et al.

[11] Patent Number: 5,624,689
[45] Date of Patent: Apr. 29, 1997

[54] FOIL BLOWING APPARATUS FOR THERMOPLASTIC SYNTHETIC RESINS

[75] Inventors: Stefan Schmitz; Joachim Lange, both of Hennef; Robert Wirtz, Troisdorf, all of Germany

[73] Assignee: Reifenhauser GmbH & Co. Maschinenfabrik, Troisdorf, Germany

[21] Appl. No.: 488,662

[22] Filed: Jun. 8, 1995

[30] Foreign Application Priority Data

Jun. 9, 1994 [DE] Germany .................. 44 20 023.4

[51] Int. Cl.$^6$ .................................................. B29C 47/22
[52] U.S. Cl. ......................................... 425/72.1; 425/326.1
[58] Field of Search .............................. 425/72.1, 325, 425/326.1, 387.1; 264/565, 569

[56] References Cited

U.S. PATENT DOCUMENTS

| | | | |
|---|---|---|---|
| 4,105,380 | 8/1978 | Zimmermann | 425/72.1 |
| 4,201,527 | 5/1980 | Verner et al. | 425/387.1 X |
| 4,846,645 | 7/1989 | Cole | 264/569 X |
| 4,955,802 | 9/1990 | Halter et al. | |

FOREIGN PATENT DOCUMENTS

| | | | |
|---|---|---|---|
| 21420 | 1/1981 | European Pat. Off. | 425/72.1 |
| 2926262 | 1/1981 | Germany . | |

Primary Examiner—Richard L. Chiesa
Attorney, Agent, or Firm—Herbert Dubno

[57] ABSTRACT

A foil blowing head for a thermoplastic synthetic resin tube has a primary air guide juxtaposed with the blowing head portion defining the internal primary air outlet, also formed with passages for the secondary air and is axially shiftable on the discharge tube from which air is led from the foil balloon.

3 Claims, 3 Drawing Sheets

5,624,689

FOIL BLOWING APPARATUS FOR THERMOPLASTIC SYNTHETIC RESINS

FIELD OF THE INVENTION

The present invention relates to a foil blowing apparatus and, more particularly, to an apparatus for blowing an extruded tube of thermoplastic synthetic resin to form a foil balloon which can be collapsed and, if desired, rolled up with or without being slitted to form a plastic foil web.

BACKGROUND OF THE INVENTION

In the blowing of thermoplastic synthetic resin foil or film, a tube is extruded in a thermoplastic state and is blown to form a foil balloon, the expansion of which reduces the wall thickness to that of a foil or film, the balloon being normally closed at an end thereof opposite the end into which the air is blown to expand the balloon.

The apparatus for this purpose can include a blowing head having an annular outlet gap through which the plastic tube emerges.

Outwardly of this tube an outer cooling device is provided which serves to cool the expanding balloon along its exterior. Within the tube and balloon, an inner cooling unit is provided which supplies the inner cooling air and the air which expands the balloon. The air within the balloon can be withdrawn by a central discharge tube, thereby allowing control of the balloon expansion.

In earlier apparatus for this purpose, the internal cooling unit comprised a primary air guide which formed an annular air outlet with an annular portion of the blowing head. A secondary air guide system was also provided and that secondary air guide system could be adjusted axially along the discharge tube.

An apparatus of this type is described in German Patent Document DE 29 26 262 A1 and in that system the primary air guide and the secondary air guide are separate parts which are individually mounted on the discharge tube. They are axially adjustable relative to one another and relative to the blowing head portion in both directions.

In this arrangement, moreover, the adjustability of the primary air guide on the one hand and of the secondary air guide on the other afforded two degrees of freedom which required careful adjustment relative to one another. As a consequence, the control of the primary air flow rate on the one hand of secondary air flow rate on the other for different operating conditions and for different blown foil products and foil blowing operations, was inordinately complex. In practice, such control could not be maintained in a real time manner to insure reliable production of uniform films.

OBJECTS OF THE INVENTION

It is therefore an object of the present invention to provide an improved apparatus for the blowing of film which allows simplified control and regulation of both the primary and secondary flow rates for matching to different operating conditions on a real time and an ongoing basis.

Another object of the present invention is to provide an improved foil blowing apparatus with improved control and regulation which will overcome drawbacks of earlier systems.

SUMMARY OF THE INVENTION

These objects and others which will become apparent hereinafter are attained, in accordance with the invention in a foil blowing apparatus of the type described in which the primary air guide which defines the primary air outlet passage simultaneously forms the secondary air guide and is provided with a plurality of secondary air outlet passages uniformly shaped around the discharge tube. According to the invention, moreover, the primary air guide is adjustable in the axial direction along the discharge tube for control and/or regulation of the primary air flow from the primary air outlet passage. However, the secondary air flow passages are of a constant passage cross section defined upon construction of the unit.

More particularly, a foil blowing apparatus for the blowing of a tubular foil of a thermoplastic synthetic resin thus can comprise:

a blowing head provided with an annular orifice through which a synthetic resin tube is extruded;

external cooling means disposed outwardly of the orifice for contacting the tube with external cooling air; and an internal cooling and blowing device within the tube and comprising:

an internal cooling air supply, a centrally disposed discharge tube opening into the tube for discharging internal cooling air therefrom, a primary air guide positioned along the internal cooling air supply for directing a primary air flow outwardly toward the tube, the primary air guide defining an outwardly directed primary air passage with an annular portion of the head inwardly of the orifice, a plurality of secondary air passages of fixed flow cross section formed in the primary air guide, equispaced about the discharge tube and conducting some of the internal cooling air to a secondary location axially downstream of the primary air passage along the tube, and adjusting means for displacing the primary air guide axially relative to the annular portion of the head and along the discharge tube for regulating a rate of flow of the primary air through the primary air passage.

The invention is based upon the fact that, in an apparatus for the blowing of thermoplastic synthetic resin foils, the primary air guide has a double function, namely, it can act as the member defining the primary air outlet channel in the classical manner but in addition can form the secondary air guide. The primary air guide must then be provided with secondary air passages of constant passage cross section which, surprisingly, does not pose a problem but rather allows matching of the primary air flow rate and the secondary air flow rate to different operating conditions in a highly simplified manner. Indeed, it is surprising that, by controlling the primary air flow rate with the axial adjustment of the primary air guide, the secondary air flow is adjusted to match any operating condition which is required and that the control can be effected in accordance with a predetermined program and/or in conjunction with a corresponding computer-based control scheme or circuit. Of course, if necessary or desirable, adjustable flow control members, e.g. diaphragms can be disposed in the secondary air outlet passages to regulate the flow cross sections thereof at the time of manufacture or assembly.

According to a feature of the invention, the secondary air passages in the primary air guide extend parallel to the axis of the discharge tube. It is important that the primary air be uniformly distributed around the circumference of the primary air outlet passage without the formation of singularities. This can be achieved easily with the present invention by providing that the primary air outlet is free from baffling or obstructive elements or, if baffles are provided in the passage, they are uniformly distributed and are positioned to obtain a homogenous annular outlet flow without singularities or radial streamlets.

A uniform distribution of the secondary air can be achieved by providing a turbulence-generating secondary air sieve or screen surrounding the secondary air outlet channels and preferably in a shell of a cylindrical shape. The sieve or screen can also be of grid configuration or provided as a grillwork if desired.

In a preferred embodiment of the invention, an external screwthread is provided on the outlet pipe and the primary air guide has an internal screwthread engaging the external thread.

A sieve mechanism or like positioning drive can be provided in a control or regulating circuit for the axial adjustment of the primary air guide along the outlet pipe.

BRIEF DESCRIPTION OF THE DRAWING

The above and other objects, features, and advantages will become more readily apparent from the following description, reference being made to the accompanying drawing in which.

DESCRIPTION OF THE PREFERRED EMBODIMENT

Figure 1:
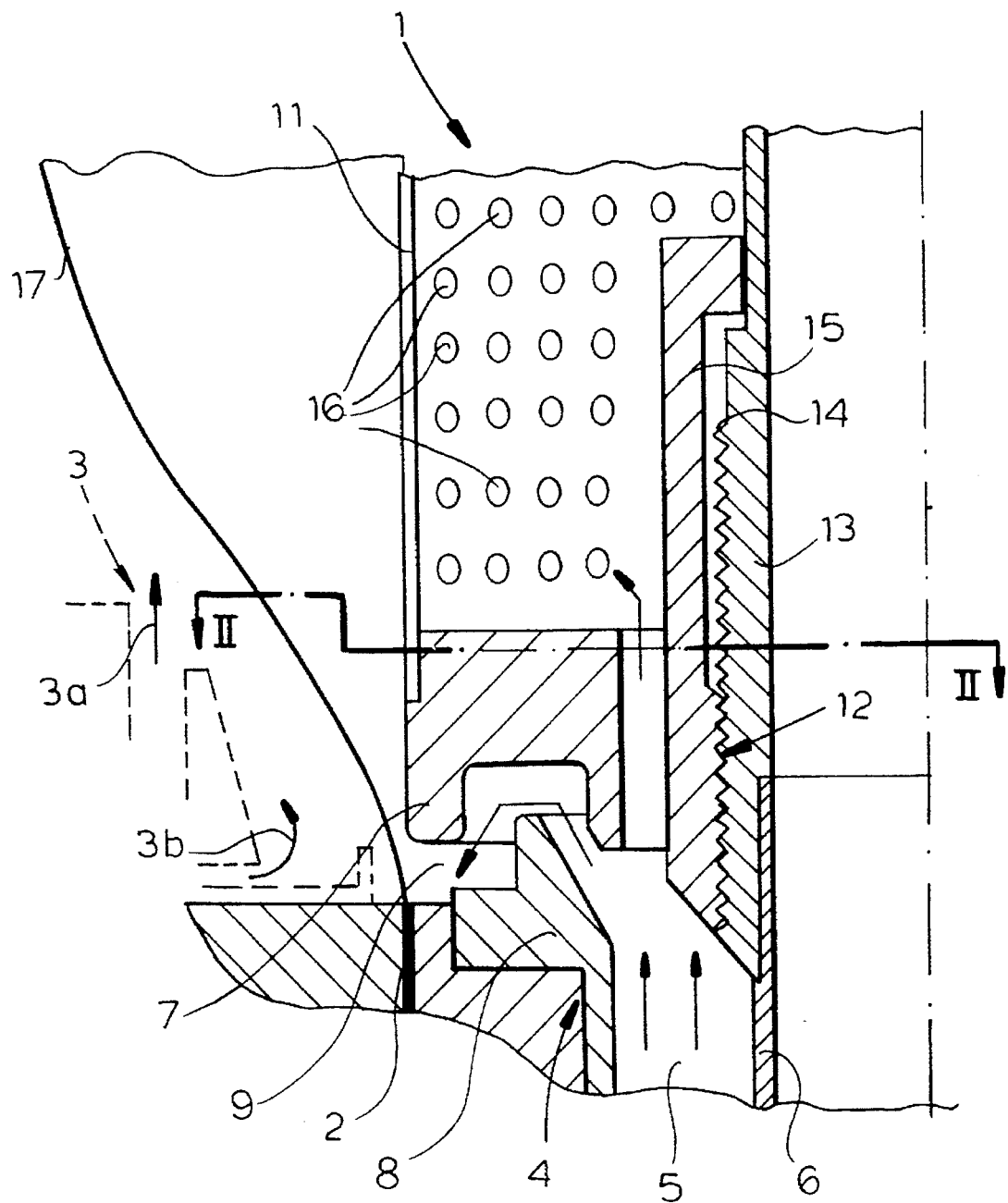
FIG. 1 is a vertical section through the lefthand portion of a blowing head according to the invention.

The apparatus shown in the drawing is part of an installation for the blowing of thermoplastic synthetic resin foils. The thermoplastic synthetic resin is extruded as a tube and is blown, in the thermoplastified state to a foil balloon. For this purpose the apparatus comprises a blowing head 1 having an annular outlet orifice 2 for the synthetic resin tube which, when blown, forms the balloon 17.

The apparatus is provided with an external cooling device 3 shown only diagrammatically and directing cooling air at 3a and 3b along the outer periphery of the balloon.

The apparatus also includes an internal cooling device 4 with an internal cooling air supply 5. Centrally of the head is provided a discharge tube 6 from which depleted cooling and blowing air is sucked out of the balloon. The internal cooling device 5 comprises a primary air guide 7 which is juxtaposed with an annular portion 8 of the blowing head and defines with the guide 7 a primary air outlet passage 9.

The primary air guide 7 also forms the secondary air supply.

Figure 2:
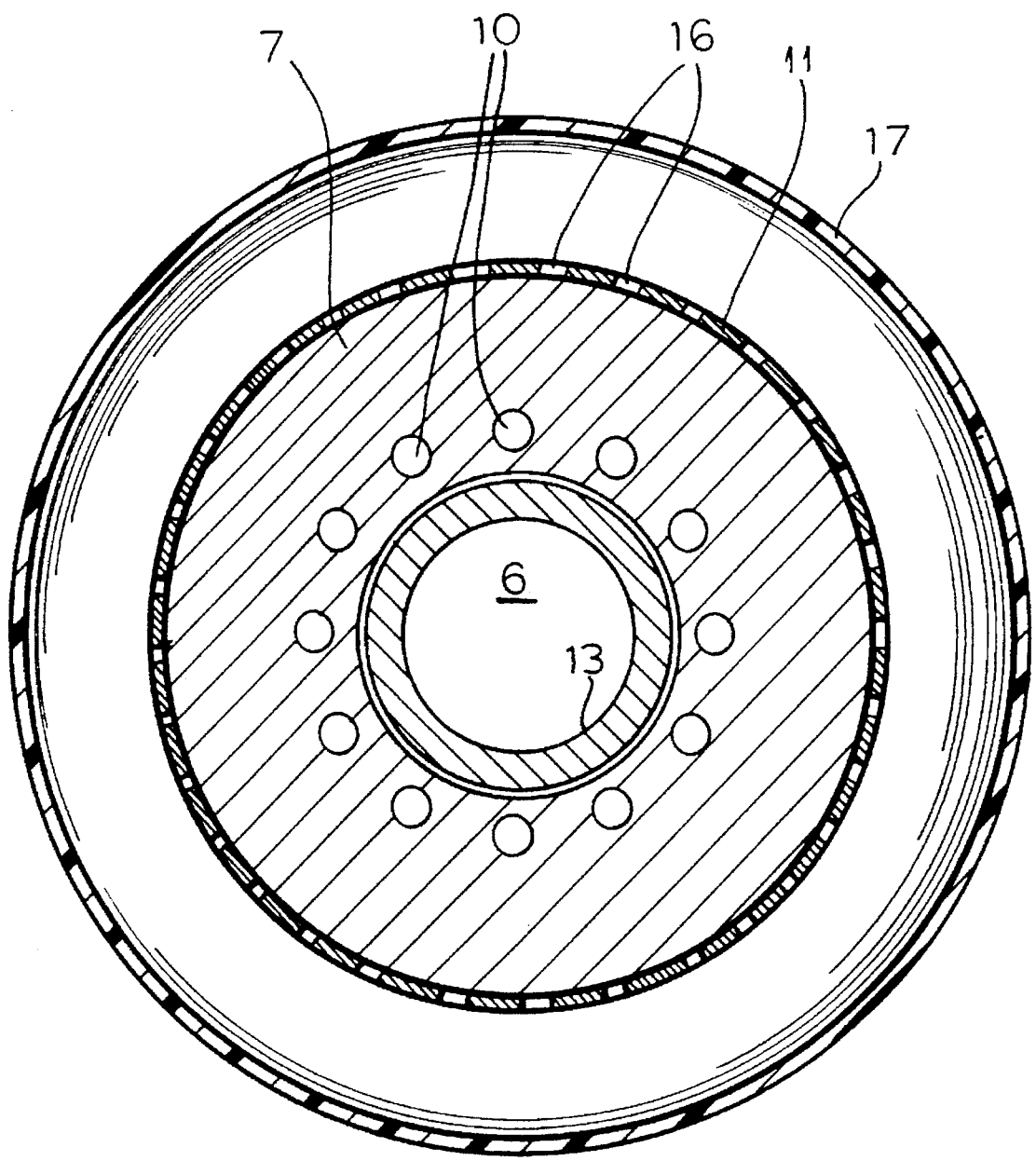
FIG. 2 is a cross sectional view through the apparatus of FIG. 1 taken generally along the line II—II of FIG. 1.

For this purpose, secondary air outlet passages 10 are uniformly spaced around the discharge tube 6 (see FIGS. 1 and 2).

For control and regulation of the primary air flow rate, the guide 7 is displacable axially along the tube 6.

For this purpose, the tube 6 may be attached to an externally thread member 13 whose external screw thread 14 is engaged by an internal screw 12 on a portion 15 of the primary air guide body 7. The mating screw threads 12 and 14 allow axial displacement of the guide 7 upon rotation of the latter relative to the discharge tube 6.

As can be seen from FIGS. 1 and 2, moreover, the secondary air outlet passage 10 are bores extending parallel to the axis of the discharge tube 6 and uniformly spaced therearound. A turbulence-generating secondary air sieve 11 with a large number of perforations 16 distributed over the circumference and axially along the sieve 11, allows the secondary air to escape into the balloon and to expand the thermoplastic tube and form the foil. Excess air is withdrawn through the tube 6.

The secondary air passing through the secondary air sieve 11 has the structure of a homogeneous isotropic turbulence forming a secondary air cushion supporting the balloon without singular locations around the periphery. The secondary air sieve 11 is carried by the primary air guide 7 and surrounds the secondary air outlet passages 10.

Figure 3:
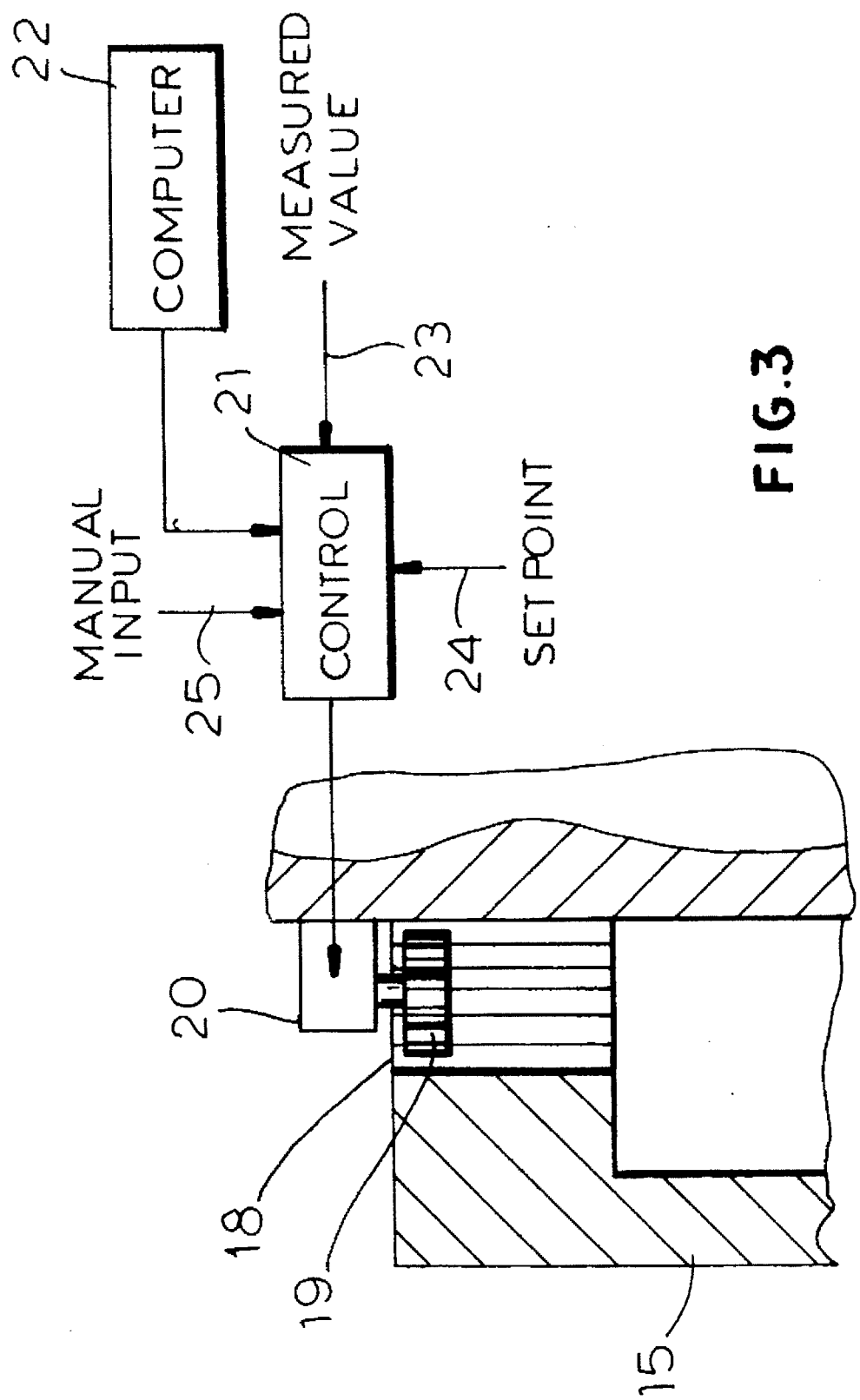
FIG. 3 is a diagrammatic detail view illustrating a portion of a control system for the apparatus of FIGS. 1 and 2.

The adjustment of the guide 7 along the external thread 14 of the tube 6, the axially extending portion 15 of the guide 7 can be provided with internal teeth 18 meshing with a pinion 19 of a servomotor 20 (FIG. 3) which can be operated by a controller 21 coupled to a computer 22 and receiving a measured value 23 from a measured value signal generator monitoring the foil. The measured value may be compared with a set point 24 supplied by the computer 22 or manually set for the control and manual adjustment may be provided based upon monitoring the operation through the computer 22 or a manual input 25. In any event, the guide 7 is angularly driven by the servodrive or servomotor in response to the control circuit, thereby axially shifting the guide 7 with the aid of the mating screw threads.

We claim:

1. A foil-blowing apparatus for blowing of a tubular foil of a thermoplastic synthetic resin, comprising:

a blowing head provided with an annular orifice through which a synthetic resin tube is extruded;

external cooling means disposed outwardly of said orifice for contacting said tube with external cooling air; and an internal cooling and blowing device within said tube and comprising:

an internal cooling air supply, a centrally disposed discharge tube opening into said tube for discharging internal cooling air therefrom, a primary air guide positioned along said internal cooling air supply for directing a primary air flow outwardly toward said tube, said primary air guide defining an outwardly directed primary air passage with an annular portion of said head inwardly of said orifice, a plurality of secondary air passages of fixed flow cross section formed in said primary air guide, equispaced about said discharge tube and conducting some of said internal cooling air to a secondary location axially downstream of said primary air passage along said tube, and adjusting means for displacing said primary air guide axially relative to said annular portion of said head and along said discharge tube for regulating a rate of flow of said primary air through said primary air passage, said secondary air passages being formed in said primary air guide parallel to the axis of said discharge tube, said adjusting means including a servodrive having a servomotor operatively connected to said primary air guide for axially shifting same.

2. The apparatus defined in claim 1, further comprising a cylindrical turbulence-generating secondary air sieve collectively surrounding said secondary air passages and carried by said guide.

3. The apparatus defined in claim 1 wherein said adjusting means includes a screwthread on said discharge tube and mating screwthread on said primary air guide.

* * * * *